(12) United States Patent  
Miller et al.

(10) Patent No.: US 12,539,090 B2  
(45) Date of Patent: Feb. 3, 2026

(54) WEIGHTBEARING SIMULATION ASSEMBLY AND METHODS OF USING THE SAME TO IMAGE A SUBJECT

(71) Applicant: SIMULATE Technologies, LLC, Gibsonia, PA (US)

(72) Inventors: Mark Carl Miller, Oakmont, PA (US); Daniel Schwartzbauer, Gibsonia, PA (US); Stephen F. Conti, Sewickley, PA (US); Sven Huijs, Madison, OH (US)

(73) Assignee: SIMULATE Technologies, LLC, Gibsonia, PA (US)

( * ) Notice: Subject to any disclaimer, the term of this patent is extended or adjusted under 35 U.S.C. 154(b) by 114 days.

(21) Appl. No.: 18/465,817

(22) Filed: Sep. 12, 2023

(65) Prior Publication Data

US 2024/0081755 A1  Mar. 14, 2024

Related U.S. Application Data

(60) Provisional application No. 63/406,085, filed on Sep. 13, 2022.

(51) Int. Cl.
*A61B 6/00* (2024.01)
*A61B 6/04* (2006.01)
*A61B 90/00* (2016.01)

(52) U.S. Cl.
CPC .......... *A61B 6/0442* (2013.01); *A61B 6/0421* (2013.01); *A61B 2090/064* (2016.02); *A61B 2560/02* (2013.01); *A61B 2560/0406* (2013.01)

(58) Field of Classification Search
CPC ........... A61B 6/00; A61B 6/04; A61B 6/0414; A61B 6/0407
See application file for complete search history.

(56) References Cited

U.S. PATENT DOCUMENTS 3,887,180 A * 6/1975 Berman ................. A63B 23/04
                                              5/624
4,282,865 A * 8/1981 Pogue ................. A61H 1/0259
                                              601/26

(Continued)

FOREIGN PATENT DOCUMENTS

AU       774376 B2    6/2004
CN    207101284 U    3/2018

(Continued)

OTHER PUBLICATIONS

International Search Report and Written Opinion from PCT/US2023/073982 mailed on Dec. 11, 2023, 9 pages.

*Primary Examiner* — Fredrick C Conley

(74) *Attorney, Agent, or Firm* — Dinsmore & Shohl LLP

(57) ABSTRACT

A weightbearing simulation assembly, includes a substrate having a mounting surface, the substrate further including a first section and second section hingedly coupled together such that the first section and second section are foldable relative one another. A subject support is disposed on a first section of the mounting surface, and a pedal assembly is disposed on a second section of the mounting surface. The pedal assembly is spaced apart from the subject support by a distance, and includes a contact plate that receives a compressive force from a subject, measures the compressive force, and provides an indication that the compressive force corresponds to a weightbearing condition of the subject.

20 Claims, 13 Drawing Sheets

(56) References Cited

U.S. PATENT DOCUMENTS

| | | | | |
|---|---|---|---|---|
| 5,743,264 A * | 4/1998 | Bonutti | ............ | A61B 6/0421 |
| | | | | 5/624 |
| 6,860,272 B2 * | 3/2005 | Carter | ............ | A61B 5/055 |
| | | | | 5/651 |
| 11,013,476 B1 | 5/2021 | Schwartzbauer et al. | | |
| 11,317,876 B2 | 5/2022 | Schwartzbauer et al. | | |
| 2002/0193683 A1 * | 12/2002 | Danielsson | ............ | A61B 5/702 |
| | | | | 600/411 |
| 2021/0378605 A1 * | 12/2021 | Schwartzbauer | ............ | A61B 6/0421 |

FOREIGN PATENT DOCUMENTS

| | | | |
|---|---|---|---|
| CN | 109171795 A | 1/2019 | |
| WO | 2008141447 A1 | 11/2008 | |
| WO | 2021175827 A1 | 9/2021 | |

\* cited by examiner

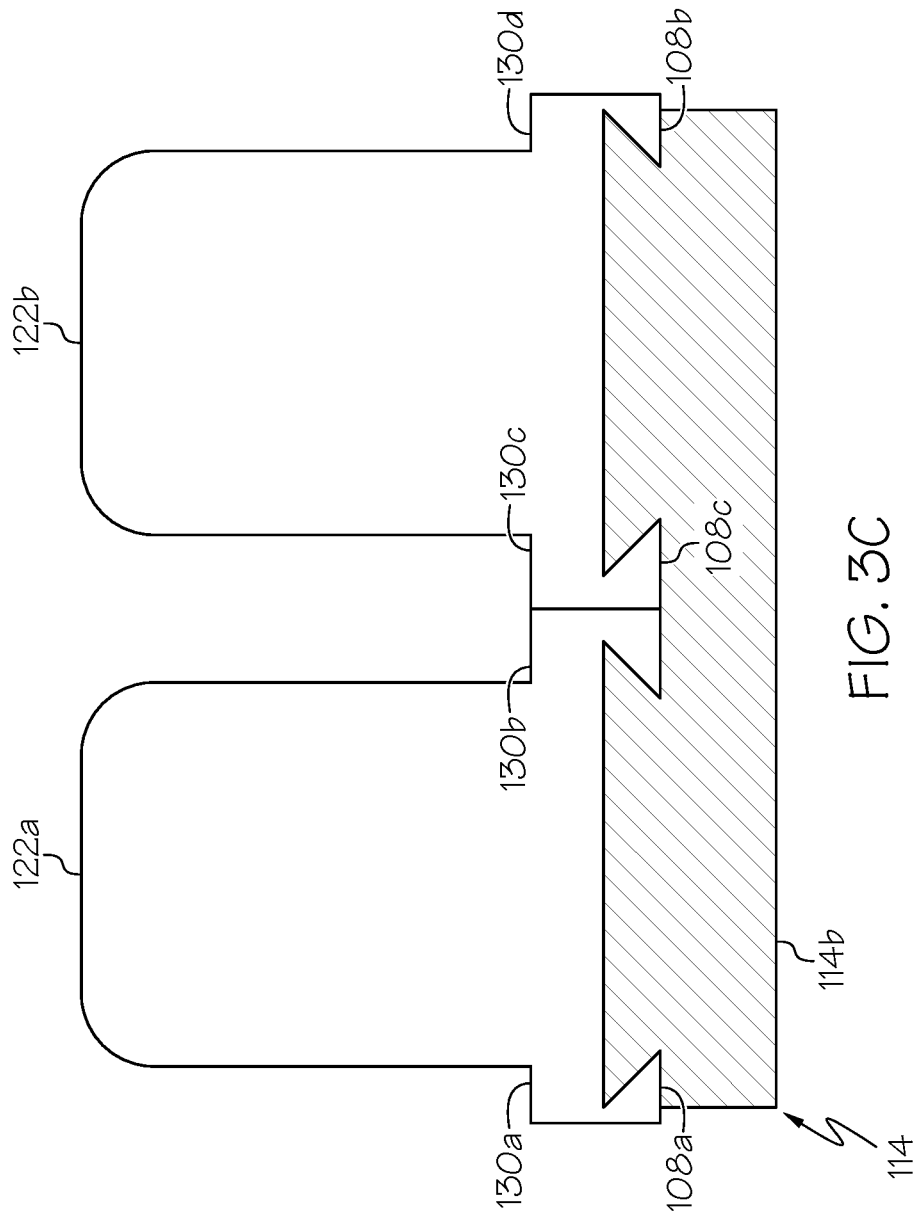

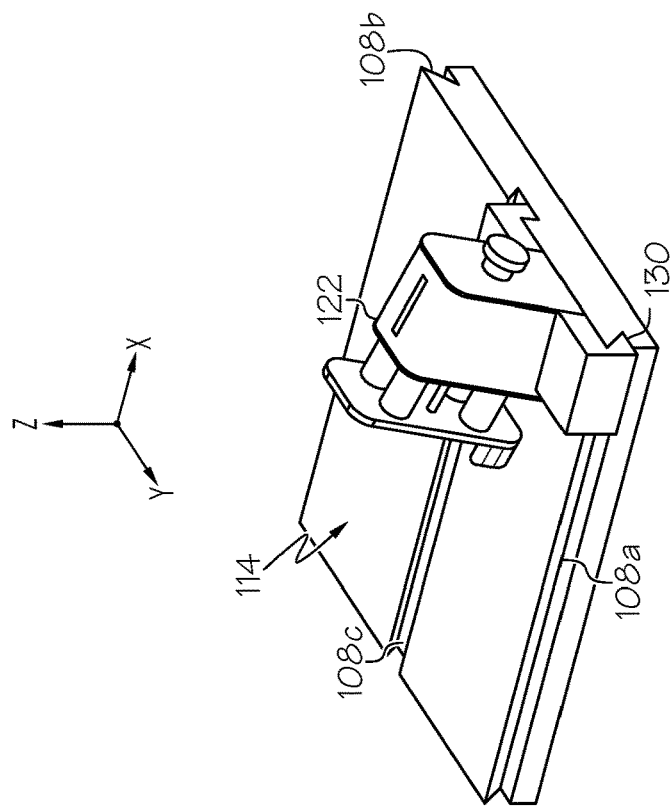
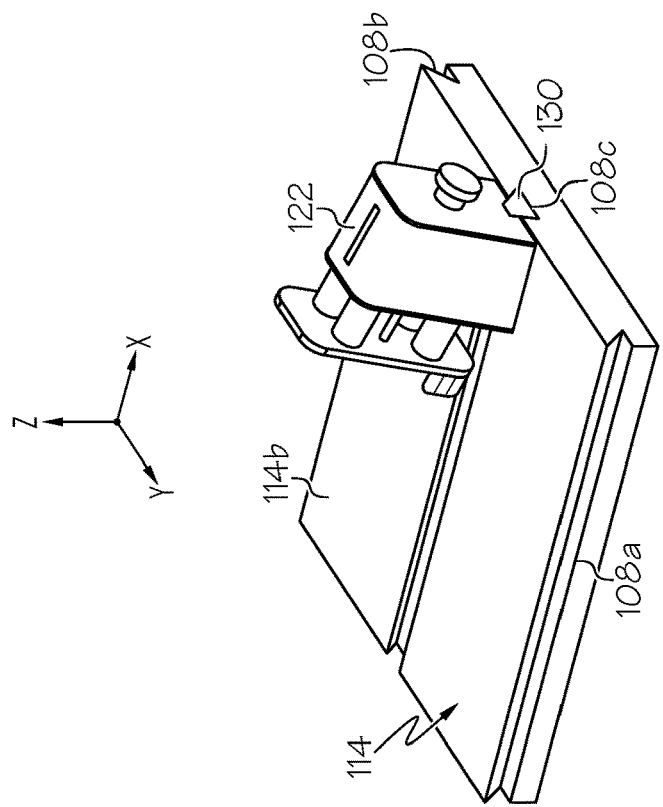

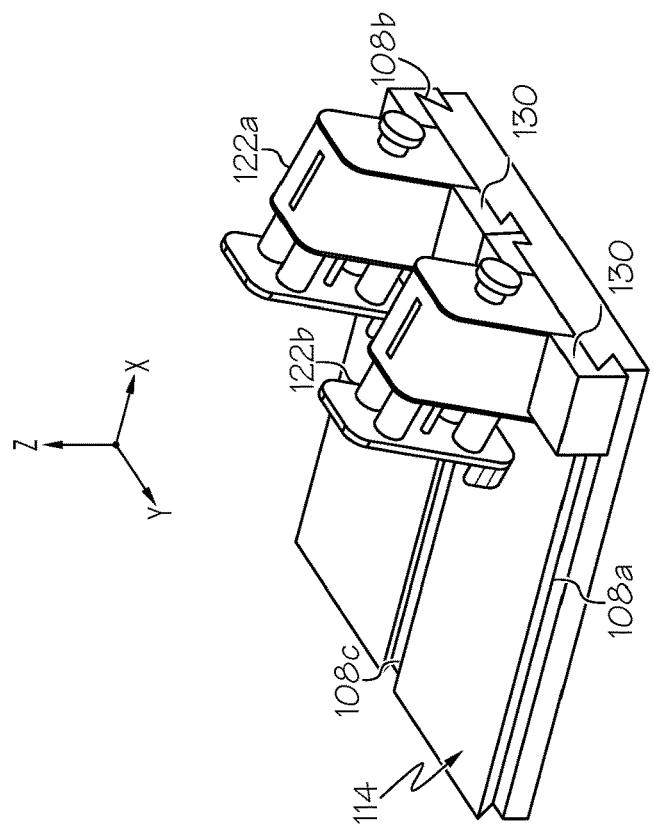
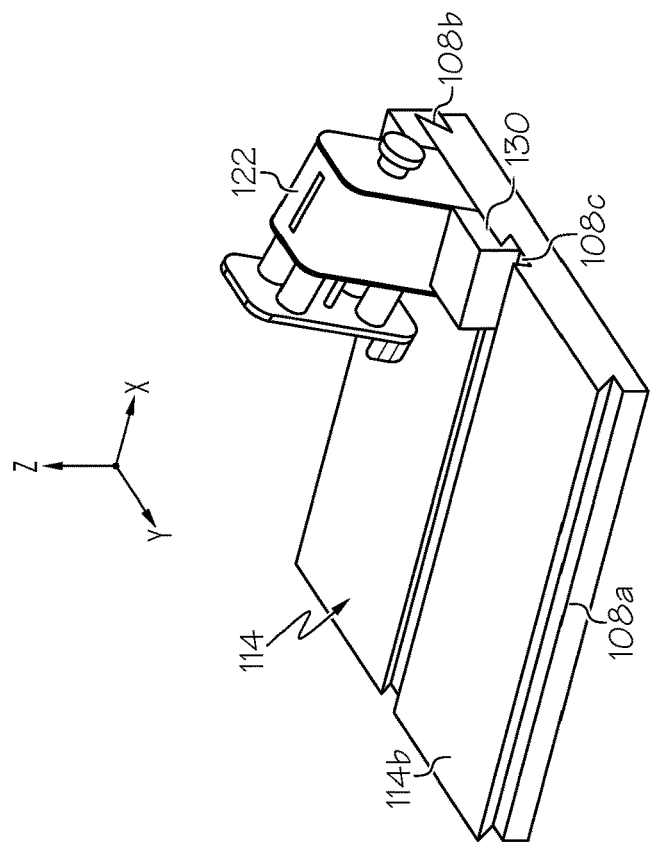

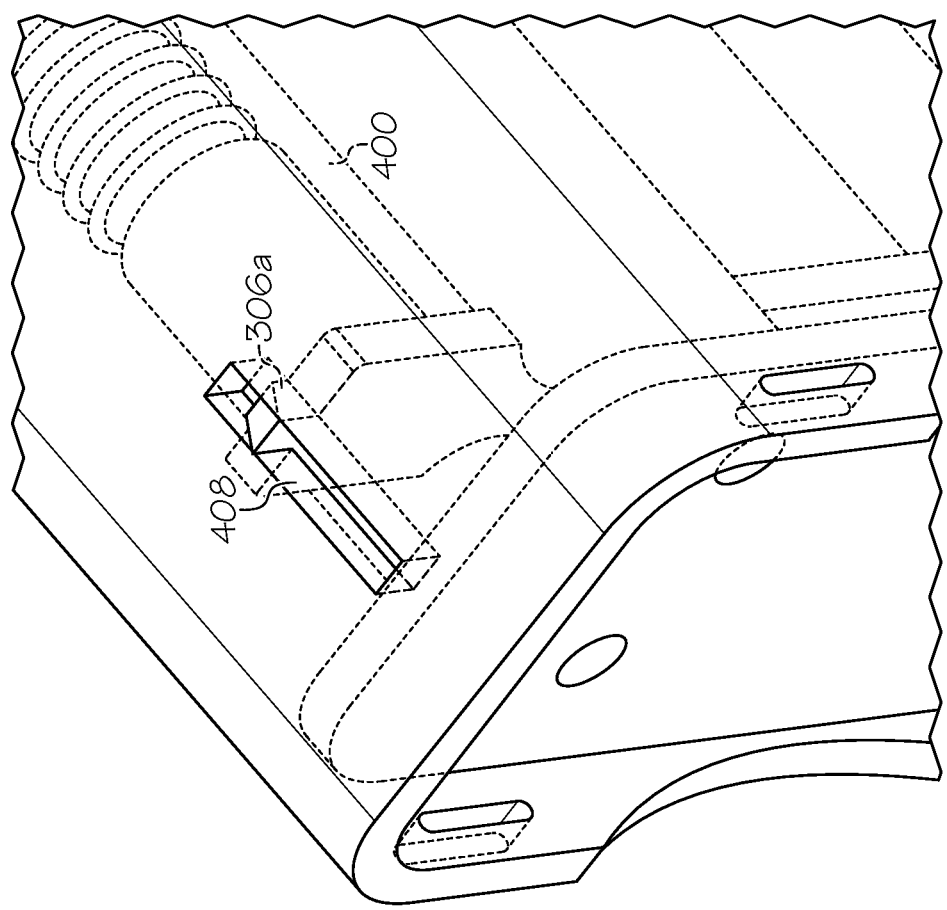

WEIGHTBEARING SIMULATION ASSEMBLY AND METHODS OF USING THE SAME TO IMAGE A SUBJECT

BACKGROUND

Field

The present application generally relates to medical imaging and, more particularly, to devices and methods for simulating weightbearing conditions.

Technical Background

In order to accurately assess a subject's lower extremities (e.g., hip, knee, foot, ankle, or the like) to plan treatment for conditions therein, it is beneficial to obtain structural measurements of the subject's lower extremities. For certain conditions (e.g., Hallux valgus), it is beneficial to obtain three-dimensional structural measurements of the subject in a loadbearing condition. Existing three-dimensional medical imaging systems (e.g., computed tomography scanners and magnetic resonance imaging systems) present various constraints for creating such a loadbearing condition during imaging to obtain three-dimensional structural measurements. For example, existing bore scanners commonly extend in a horizontal direction, rendering gravity unavailable to supply a normal load to the subject's foot during imaging. Further, existing vertical bore scanners that allow a subject to stand while scanning is completed are extremely expensive, difficult to use, and do not enjoy widespread adoption.

SUMMARY

In embodiments, a weightbearing simulation assembly is disclosed. A weightbearing simulation assembly, includes a substrate having a mounting surface, the substrate further including a first section and second section hingedly coupled together such that the first section and second section are foldable relative one another. A subject support is disposed on a first section of the mounting surface, and a pedal assembly is disposed on a second section of the mounting surface. The pedal assembly is spaced apart from the subject support by a distance, and includes a contact plate that receives a compressive force from a subject, measures the compressive force, and provides an indication that the compressive force corresponds to a weightbearing condition of the subject.

In another embodiment, a weightbearing simulation assembly is disclosed. The weightbearing simulation assembly includes a substrate having a mounting surface, the substrate further including a first section having a plurality of extrusions and a second section having a plurality of rails, the plurality of rails being configured to receive the plurality of extrusions. At least one pedal assembly is translatably coupled to the second section of the substrate, the at least one pedal assembly including a contact plate configured to receive a compressive force from a subject, measure the compressive force, and provide an indication that the compressive force corresponds to a weightbearing condition of the subject.

In yet another embodiment still, a method for capturing an image of a subject using a weightbearing simulation assembly is disclosed. The method includes, positioning the subject on a subject support of the weightbearing simulation assembly; adjusting the weightbearing simulation assembly based on the subject and imaging requirements; securing the subject to the weightbearing simulation assembly; positioning the weightbearing simulation assembly for imaging; instructing the subject to apply a force to a pedal assembly positioned on the weightbearing simulation assembly; and capturing the image of an extremity of the subject.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3C depicts a partial front side view of the subject imaging assembly of FIGS. 3A and 3B including a pedal assembly, according to one or more embodiments shown and described herein;

FIG. 4A depicts a partial perspective view of the subject imaging assembly of FIGS. 3A and 3B including a pedal assembly, according to one or more embodiments shown and described herein;

FIG. 4B depicts a partial perspective view of the subject imaging assembly of FIGS. 3A and 3B including a pedal assembly, according to one or more embodiments shown and described herein;

FIG. 4C depicts a partial perspective view of the subject imaging assembly of FIGS. 3A and 3B including a pedal assembly, according to one or more embodiments shown and described herein;

FIG. 4D depicts a partial perspective view of the subject imaging assembly of FIGS. 3A and 3B including a pedal assembly, according to one or more embodiments shown and described herein;

FIG. 7C depicts a partial top-side perspective view of the pedal assembly of FIG. 6, according to one or more embodiments shown and described herein.

DETAILED DESCRIPTION

Figure 1A:
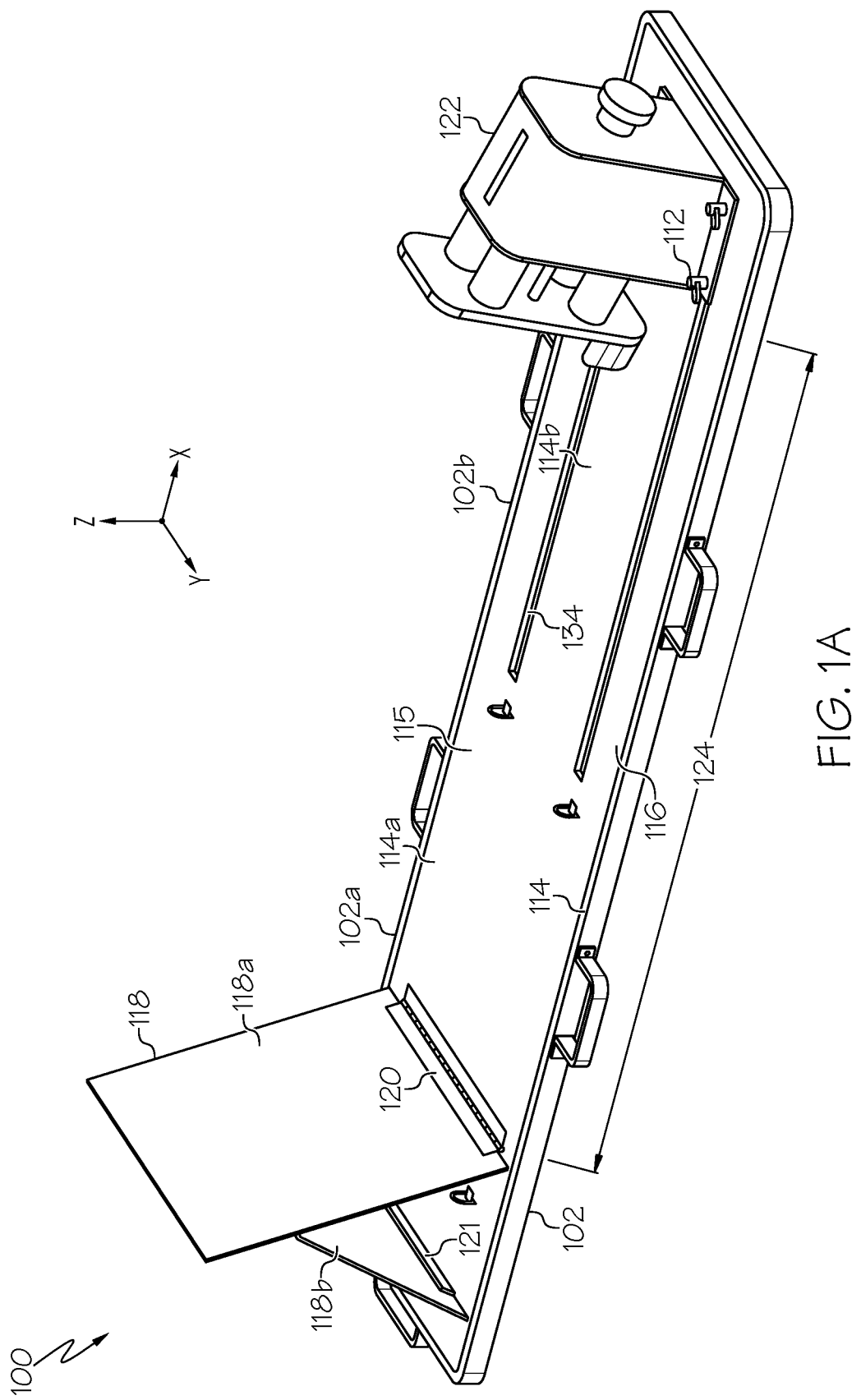
FIG. 1A depicts a perspective view of a subject imaging assembly, according to one or more embodiments described herein.

Reference will now be made in detail to embodiments of a weightbearing simulation assembly for imaging a lower extremity (e.g., a foot, an ankle, a leg, a knee, a hip, or the like) of a subject and methods for using the same for imaging a subject. The weightbearing simulation assembly may include a substrate on which a subject support and a pedal assembly are disposed. In embodiments, the substrate of the weightbearing simulation assembly is disposed on a support platform of a subject imaging assembly. The subject imaging assembly may include an imaging system such as a computer tomography (CT) scanner or a magnetic resonance imaging (MRI) system. The relative positioning of the weightbearing simulation assembly and the imaging system may be adjustable (e.g., via an actuator of the support platform) such that the pedal assembly may be movable to a field of view of the imaging system. In embodiments, the pedal assembly includes a spring assembly including a contact plate facing the subject support and a compression plate separated by at least one spring member.

In an aspect of the present disclosure, the subject supplies a compressive force to the pedal assembly to place the pedal assembly in an imaging position. In response to the subject supplying the compressive force to compress the spring member, the contact plate moves in a compression direction until the contact plate contacts motion limiters of the spring assembly disposed between the contact plate and the compression plate. Once the contact plate contacts the motion limiter, the contact plate is disposed an imaging distance from the compression plate. The spring member supplies resistance to the subject so as to measure the force provided by the subject. In embodiments, the motion limiters are adjustable so as to change the imaging distance and the resistance supplied by the at least one spring member in the presence of the compressive force supplied by the subject. In embodiments, the resistance supplied by the spring member may be individually tailored to the subject to simulate a weightbearing condition for the subject for capturing an image of the subject's lower extremities. Beneficially, the motion limiters provide a visual indication of whether the subject has supplied an adequate compressive force to simulate a weightbearing condition. Additionally, the motion limiters may be distributed to ensure that the subject properly distributes the compressive force throughout an entirety of the subject's foot, preventing the subject from applying too much force using one area of the foot (e.g., a heel) and too little force with another (e.g., a forefoot).

The weightbearing simulation assembly described herein is adaptable to various different imaging positions. For example, the pedal assembly described herein includes a pedal support assembly supporting the spring assembly and an adjustable support element coupling the pedal support assembly to the substrate of the weightbearing simulation assembly. The adjustable support element may include a plurality of support positions to support the pedal support assembly at various orientations. In embodiments, selection among the different orientations alters a relative angle between the compression direction of the spring assembly and an axis of the imaging system to change an angle of the subject's foot included in captured images. The plurality of support positions of the adjustable support element may facilitate capturing images of a subject's ankle, forefoot, and hindfoot with predetermined loads applied to each thereof.

Additionally, the subject support may be configurable for a plurality of different imaging situations. For example, in embodiments, the subject support is rotatably coupled to the substrate such that the subject support is rotatable about a first axis of rotation that is substantially parallel to a surface normal of the substrate to facilitate positioning the subject on the weightbearing simulation assembly. In embodiments, the subject support is also rotatable about a second axis of rotation that is substantially perpendicular to the first axis of rotation to facilitate tilting the positioned patent with respect to the imaging system to facilitate the imaging system being tilted at various angles for additional imaging flexibility. In addition, the subject support may also be attached to the substrate via a translation support mechanism facilitating adjusting a distance between the pedal assembly and the subject support for accommodating subjects having different leg lengths. As such, the weightbearing simulation assemblies described herein facilitate capturing a plurality of different load-bearing images of the subject's lower extremities in a manner particularly tailored to the subject, thus capturing a complete three-dimensional image for diagnosis and treatment of various conditions.

Beneficially, the weightbearing simulation assemblies described herein require a subject to supply a compressive force to a pedal assembly with a specified foot (e.g., a foot causing the subject discomfort). By providing an indication (e.g., the contact plate contacting the motion limiter) that the subject has supplied a desired amount compressive force, the weightbearing simulation assemblies described herein prevent the subject from off-loading from the specified foot in order to ensure that the specified foot is under a true weightbearing condition. Such a weightbearing condition beneficially facilitates the components of subject's foot being accurately imaged in a functional state. Moreover, compatibility with existing horizontal CT scanners enables three-dimensional functional imaging of the subject's foot at relatively low cost for diagnosing subject foot conditions as compared to existing weightbearing CT scanners. Additionally, the approaches described herein are beneficial over existing weightbearing x-ray imaging techniques because the weightbearing simulation assemblies described herein facilitate weightbearing imaging with three-dimensional modalities (e.g., CT scanning, MRI, etc.).

Figure 1B:
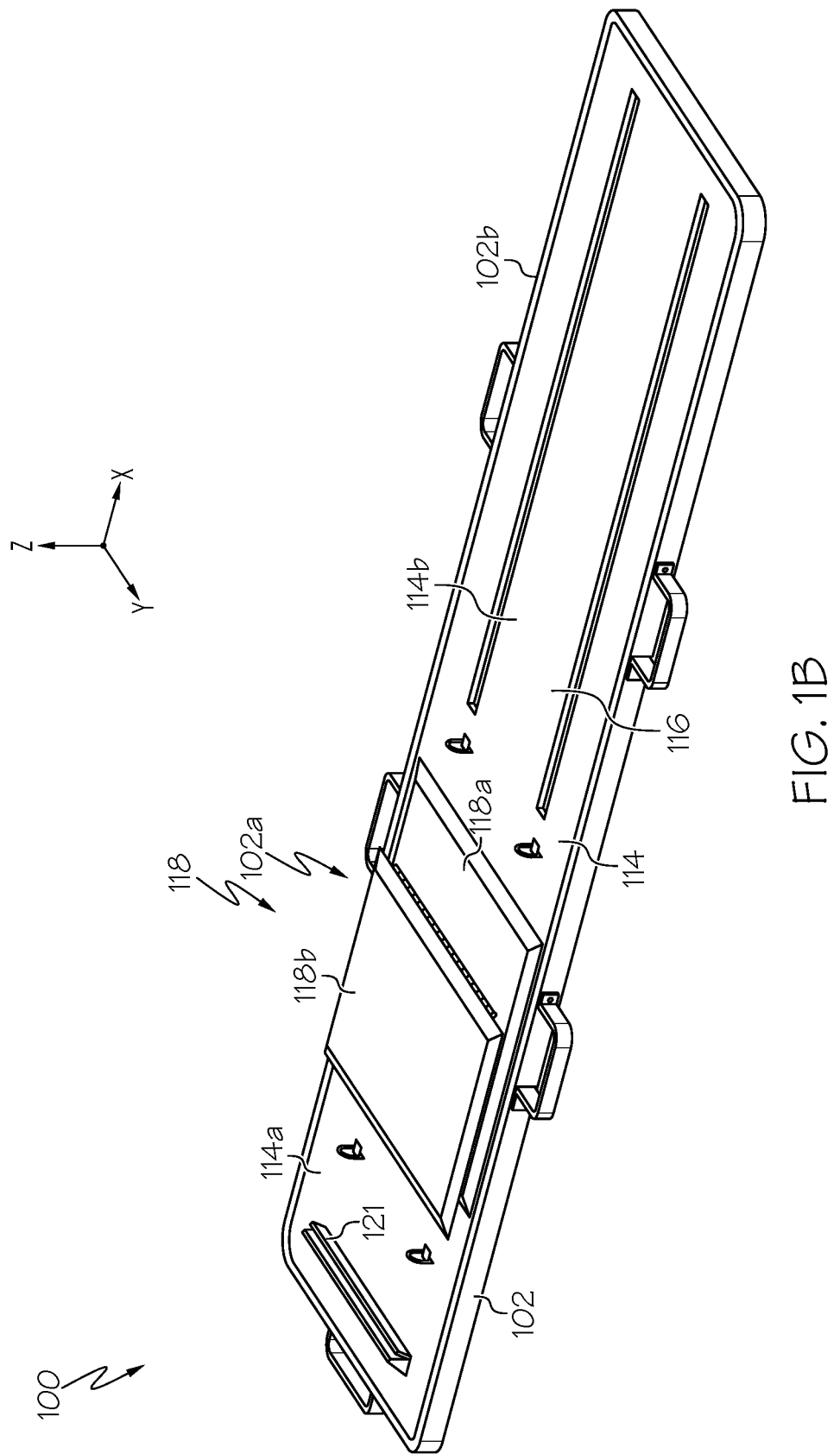
FIG. 1B depicts another perspective view of the subject imaging assembly shown in FIG. 1A, according to one or more embodiments described herein.

Referring now to FIGS. 1A-1B, a subject imaging assembly 100 is depicted. The subject imaging assembly 100 is depicted to include a support platform 102 and a weightbearing simulation assembly 112 having a substrate 114. In embodiments, the support platform 102 may be derived from an existing medical imaging system such as a computed tomography (CT) scanner or a magnetic resonance imaging (MRI) system. For example, in embodiments, the support platform 102 may comprise a table top of an existing CT scanner with the bedding removed to provide a surface for attaching the weightbearing simulation assembly 112.

In other embodiments, the support platform 102 may include a plurality of openings, such as holes, which may allow the support platform 102 to be positioned on any manufacturer's machine surface (e.g., CT scanner, MRI machine, etc.). In these embodiments, the shape of the support platform 102 and/or the plurality of openings may be conformed to the surface shape of a particular manufacturer's device. For example, the shape of the support platform 102 and the plurality of openings may be conformed to fit either a CT machine or an MRI machine manufacturer by a particular provider. In other embodiments still, the support platform 102 may include a plurality of openings which conform to a multitude of devices (e.g., CT scanners, MRI machines, etc.) such that the support platform 102 may be used with a variety of devices.

Similarly, the weightbearing simulation assembly 112 may be adapted to fit to any available subject imaging system. As such, the dimensions of the substrate 114 and any mechanisms incorporated in the weightbearing simulation assembly 112 for attaching the substrate 114 to the support platform 102 may vary depending on the subject imaging system into which the weightbearing simulation assembly 112 is being incorporated.

The support platform 102 and substrate 114 of the weightbearing simulation assembly 112 both extend in a first direction (e.g., the x-direction of the coordinate axes shown in FIGS. 1A-1B). In embodiments, the support platform 102 includes an entire portion (e.g., tabletop) that is movable in the first direction such that a combination of the portion of the support platform 102 and the weightbearing simulation assembly 112 may be moved in the first direction (e.g., into and/or towards an opening of an imaging system). It should also be appreciated that certain embodiments may not include the support platform 102. For example, in such embodiments, the weightbearing simulation assembly 112 may be disposed on a support (e.g., a cart).

Referring still to FIG. 1A, the weightbearing simulation assembly 112 comprises a substrate 114 having a mounting surface 116, a subject support 118 disposed on the mounting surface 116 and a pedal assembly 122 disposed on the mounting surface 116. The subject support 118 is separated from the pedal assembly 122 by a distance 124 in the first direction. In embodiments, the substrate 114 is constructed of a material (e.g., carbon fiber) that does not interfere with the imaging capabilities of the device on which the subject imaging assembly 100 is mounted. For example, when the weightbearing simulation assembly 112 has MRI compatibility, the substrate may be conducted of any material that is not ferromagnetic. In contrast, in embodiments in which the weightbearing simulation assembly 112 is compatible with a CT scanner, the substrate 114 may be made of radiopaque or other similar materials.

As described herein, the substrate 114 may possess any size, shape, and configuration based on specifications of the imaging system onto which the assembly is incorporated. For example, the substrate 114 may be planar, curved, or any other shape that is required to interface the substrate 114 with a particular manufacturer's device. In some embodiments, the substrate 114 may include additional surface features (e.g., ridges, edges, grooves, etc.) that may allow the substrate to more easily interface with the particular manufacturer's device.

Referring now to FIGS. 1A and 1B, the support platform 102 and the substrate 114 of the weightbearing simulation assembly 112 may be foldable in order to increase the portability of the subject imaging assembly 100. In these embodiments, the support platform 102 may include a first section 102a and a second section 102b, which may be foldably coupled relative to one another. In these embodiments, the first section 102a and the second section 102b may be moved from a folded position (e.g., a position in which the first section 102a and the second section 102b are folded together) to an imaging position (e.g., a position in which the first section 102a and the second section 102b are each extended in the first direction).

For example, the first section 102a and the second section 102b may be formed as separate components that are coupled via a hinge, or other similar mechanism, that allows the first section 102a and the second section 102b to fold relative to one another. When the support platform 102 is not being actively utilized for imaging purposes, the first section 102a and the second section 102b may be moved to the folded position, such that the support platform 102 may be easier to transport and/or store. In these embodiments, the hinge, or other similar mechanism, may further include a locking mechanism, which may maintain the first section 102a and the second section 102b in the imaging position when the support platform is being utilized.

Referring still to FIGS. 1A and 1B, the substrate 114 may further include a first section 114a and a second section 114b which may be foldably coupled to one another. In these embodiments, the first section 114a and the second section 114b may be moved from a folded position (e.g., a position in which the first section 114a and the second section 114b are folded together) to an imaging position (e.g., a position in which the first section 114a and the second section 114b are each extended in the first direction).

For example, the first section 114a and the second section 114b may be formed as separate components that are coupled via a hinge, or other similar mechanism, that allows the first section 114a and the second section 114b to fold relative to one another. When the substrate 114 is not being actively utilized for imaging purposes, the first section 114a and the second section 114b may be moved to the folded position, such that the substrate 114 may be easier to transport and/or store. In these embodiments, the hinge, or other similar mechanism, may further include a locking mechanism, which may maintain the first section 114a and the second section 114b in the imaging position when the support platform is being utilized.

In embodiments in which both the support platform 102 and the substrate 114 are foldable components, it should be understood that a single hinge, or other similar mechanism, may be used to move the support platform 102 and the substrate 114 from the folded position to the imaging position. In these embodiments, it may be possible to fold both the support platform 102 and the substrate 114 without the need to remove the substrate 114 from the support platform 102.

Referring again to FIGS. 1A and 1B, in embodiments, the subject support 118 is coupled to the mounting surface 116 via a hinge 120, such that the subject support 118 is collapsible relative to the mounting surface 116 of the weightbearing simulation assembly 112. In these embodiments, the subject support 118 may be movable between an upright position (e.g., a position in which the subject support 118 extends perpendicularly away from the mounting surface 116, as depicted in FIG. 1A) and a collapsed position (e.g., a position in which the subject support 118 lies flush with the mounting surface 116, as depicted in FIG. 1B).

As depicted in FIGS. 1A and 1B, the subject support 118 may include a first support element 118a and a second support element 118b, where the second support element 118b is hingedly coupled to the first support element 118a. In the upright position, as depicted in FIG. 1A, the first support element 118a may be coupled to the hinge 120, which is in turn coupled to the mounting surface 116. In this position, the second support element 118b may extend between the first support element 118a and a stopper 121 fixedly secured to the mounting surface 116. In these embodiments, the positioning of the second support element 118b between the first support element 118a and the stopper 121 may act to secure the subject support 118 in the upright position.

Turning now to FIG. 1B, the subject support 118 may be moved from the upright position to the collapsed position by pulling (e.g., manually or otherwise) the first support element 118a towards the mounting surface 116. In these embodiments, the first support element 118a may rotate about the hinge 120, such that the first support element 118a collapses downwardly towards the mounting surface 116. As the first support element 118a rotates about the hinge 120, the second support element 118b may slide in a longitudinal direction away from the stopper 121. The first support element 118a may continue to rotate about the hinge 120 until the first support element 118a lies flush with the mounting surface 116, at which point the second support element 118b may similarly lie flush on top of the first support element 118a. It should be understood that the moving the subject support to the collapsed position may increase the portability and/or storability of the substrate 114.

Referring again to FIGS. 1A and 1B, the weightbearing simulation assembly 112 may further include a pedal assembly 122, which may be positioned on the mounting surface 116 of the substrate 114 such that a distance 124 between the pedal assembly 122 and the subject support 118 is adjustable to accommodate different subjects. In these embodiments, the mounting surface 116 may further include a translation support mechanism 134 on which the pedal assembly 122 is coupled, such that the pedal assembly is movable along the length of the mounting surface 116 in the longitudinal direction.

In these embodiments, the translation support mechanism 134 may include one or more tracks (e.g., a pair of tracks) that mate with the corresponding pedal assembly 122. In embodiments, fasteners (not depicted) coupling the pedal assembly 122 to the translation support mechanism 134 may be loosened and the distance 124 may be manually adjusted to a particular subject. Alternative translation support mechanisms 134 are envisioned. In embodiments, the translation support mechanism 134 comprises an actuator (e.g., a translation stage) coupling the pedal assembly 122 to the mounting surface 116 such that the distance 124 may be adjusted electronically. In embodiments, the translation support mechanism 134 is disposed on a mounting platform (not depicted) attached to the substrate 114. The mounting platform may be movable (e.g., via a telescoping arm or the like) in a second direction (e.g., the z-direction depicted in FIG. 1C) substantially perpendicular to the first direction.

In embodiments, the pedal assembly 122 may be coupled to the translation support mechanism 134 via a tilting mechanism such that the pedal assembly 122 is tiltable relative to the mounting surface 116 of the support platform 102. Adjustment of the angle between the pedal assembly 122 and the mounting surface 116 facilitates the subject supplying a compressive force to the pedal assembly 122 when the foot of the subject is placed at an angle to a surface normal 115 (see FIG. 1A) of the mounting surface 116.

In embodiments, the distance between the pedal assembly 122 and the subject support 118 is adjusted to particular values depending on a relative angle at which the foot of the subject extends relative to the surface normal 115. For example, in embodiments, the pedal assembly 122 may be adjusted such that the foot of the subject may extend at an angle at 0 degrees, 15 degrees, 30 degrees, 45 degrees, and/or 60 degrees relative to the surface normal 115. The surface normal 115 may coincide with an imaging axis of an imaging system such that altering the angle of the foot of the subject facilitates imaging different cross-sections of the foot. In embodiments, users of the subject imaging assembly 100 may be instructed to adjust the distance between the subject support 118 and the pedal assembly 122 based on the relative angle of the foot based on a color coding scheme or the like.

Referring again to FIGS. 1A-1B, it should be understood that the pedal assembly 122 may further be removably coupled to the translation support mechanism 134, such that the pedal assembly 122 may be removed from the mounting surface 116 of the weightbearing simulation assembly 112. In these embodiments, removable of the pedal assembly 122 from the mounting surface may allow the substrate 114 and the support platform 102 to be moved to the collapsed position, as has been described herein, such that the subject imaging assembly 100 may be easily stored and transported.

Furthermore, removably coupling the pedal assembly 122 to the translation support mechanism 134 allows the pedal assembly 122 to be replaced with other pedals that may be better suited for a particular imaging application. For example, particular pedal assemblies 122 may be matched to specific anatomical features, or may be made with certain material (e.g., radiopaque, etc.) that are desirable for particular imaging procedures. Further still, different pedal assemblies 122 may be desirable for different imaging procedures (e.g., CT scans, MRIs, etc.). Because the pedal assembly 122 may be removed from the translation support platform 102, it may be possible to use a plurality of pedal assemblies 122 interchangeably without the need to utilize a new subject imaging assembly 100 for different imaging procedures.

Figure 2:
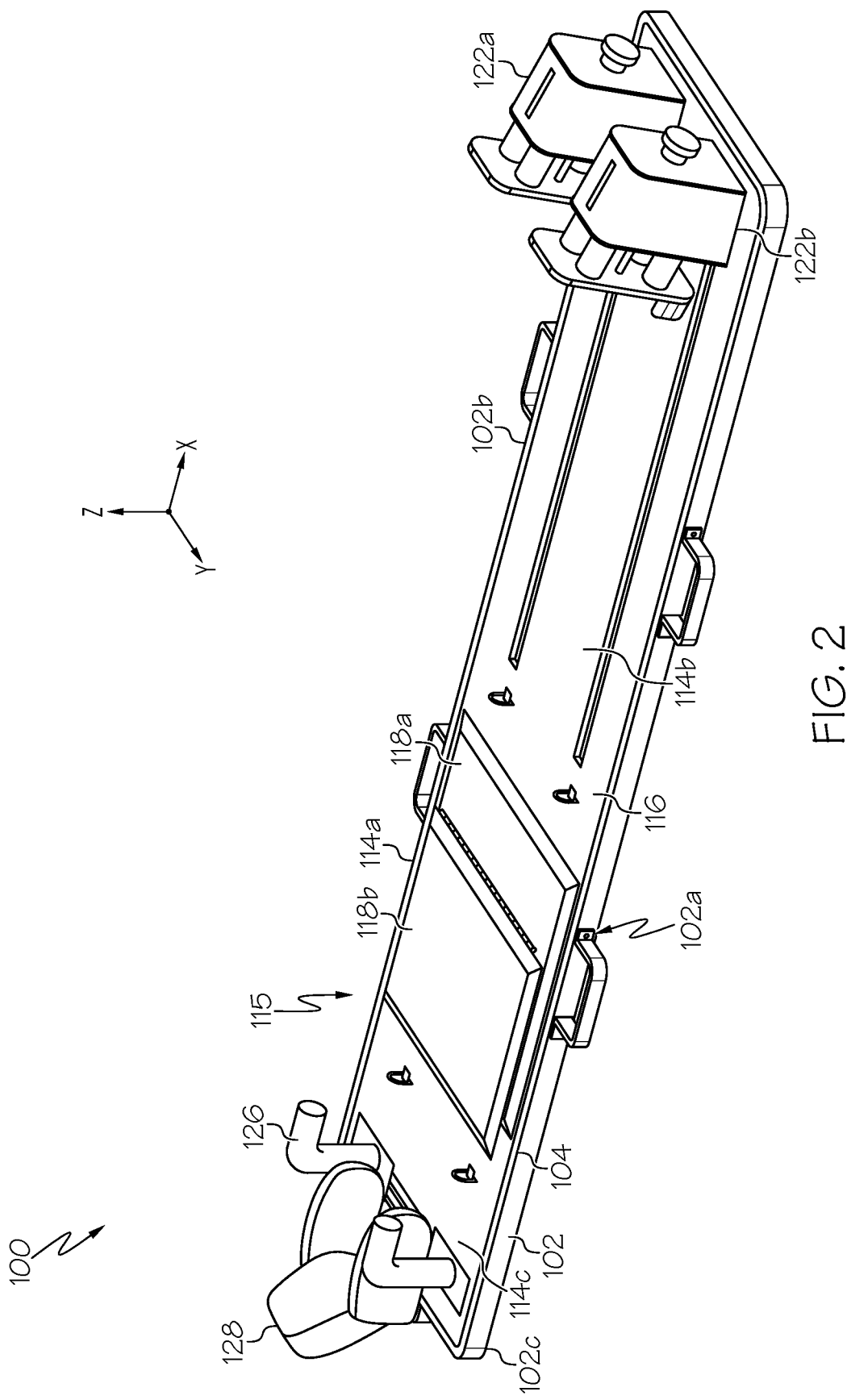
FIG. 2 depicts a perspective view of another embodiment of the subject imaging assembly shown in FIG. 1A, according to one or more embodiments described herein.

Referring now to FIG. 2, it should be appreciated that, in some embodiments, the dimensions of the support platform 102 and substrate 114 may vary in order to accommodate subjects of various sizes and/or in various imaging positions. For example, as depicted in FIGS. 1A and 1B, the subject may be in a seated (e.g., upright or otherwise) position between the subject support 118 and the pedal assembly 122 when imaging is being conducted on a foot and/or ankle of the subject. However, it may be necessary for the subject to be placed in different positions on the substrate 114 in order to accurately image different portions of the subject, such as a knee and/or hip.

In order to accommodate a subject in a horizontal (e.g., prone or supine) position, the first section 114a of the substrate 114 may further include a cavity 104. In these embodiments, when the subject support 118 is moved to the collapsed position, as has been described herein with reference to FIG. 1B, the subject support 118 may be collapsed into the cavity 104 formed in the first section 114a of the substrate 114. With the subject support 118 in the collapsed position, the first support element 118a may lie flush with the first section 114a of the substrate 114, such that a subject may lie down or be seated upright on the substrate 114 without interference from subject support 118. Although FIG. 2 depicts the subject support 118 as being collapsible within the cavity 104, it should be appreciated that, in some embodiments, the subject support 118 may be removed from the first section 114a of the substrate 114 prior to conducting imaging that requires a subject to be in a horizontal position (e.g., lying down or otherwise).

Referring still to FIG. 2, in these embodiments, the support platform 102 may further include a third section 102c and the substrate 114 may further include a third section 114c that may be used to extend a length of the support platform 102 and substrate 114, respectively, in order to allow for a subject to lie down or be seated on the subject imaging assembly 100. For example, the third section 102c may be formed as a separate, extension component that is coupled via a hinge, or other similar mechanism, that allows the third section 102c to fold relative to the first section 102a and/or second section 102b. In other embodiments, the third section 102c may be integrally formed with the first section 102a, such that the first section 102a and the third section 102c may fold together relative to the second section 102b.

Referring still to FIG. 2, the third section 114c of the substrate 114 may be formed as a separate component that is coupled to the first section 114a via a hinge, or other similar mechanism, that allows the third section 114c to fold relative the first section 114a. As further depicted in FIG. 2, a pair of brackets 126, such as shoulder brackets or shoulder pads, may be coupled to the third section 114c of the substrate 114, and a support 128, such as a head and/or neck support, may be coupled to the third section 102c of the support platform 102. In these embodiments, a subject may lie down or be seated upright on the weightbearing simulation assembly 112 such that the subject engages both the pair of brackets 126 and the pedal assembly 122. Accordingly, the force exerted between the pedal assembly 122 and the pair of brackets 126 may be used for imaging purposes when conducting imaging on knee, hip, and other similar areas.

As further depicted in FIG. 2, the pedal assembly 122 may include a plurality of pedal assemblies, such as a first pedal assembly 122a and a second pedal assembly 122b. For example, in some embodiments, it may be necessary to simulate forces on each extremity of a subject simultaneously in order to achieve desired imaging. In these embodiments, the subject imaging assembly 100 may include the first pedal assembly 122a and the second pedal assembly 122b such that a subject may exert a force on the subject imaging assembly 100 with both lower extremities in order to simulate a loadbearing condition for the subject. Operation of the pedal assembly 122 will be described in additional detail herein with reference to FIG. 6.

Figure 3A:
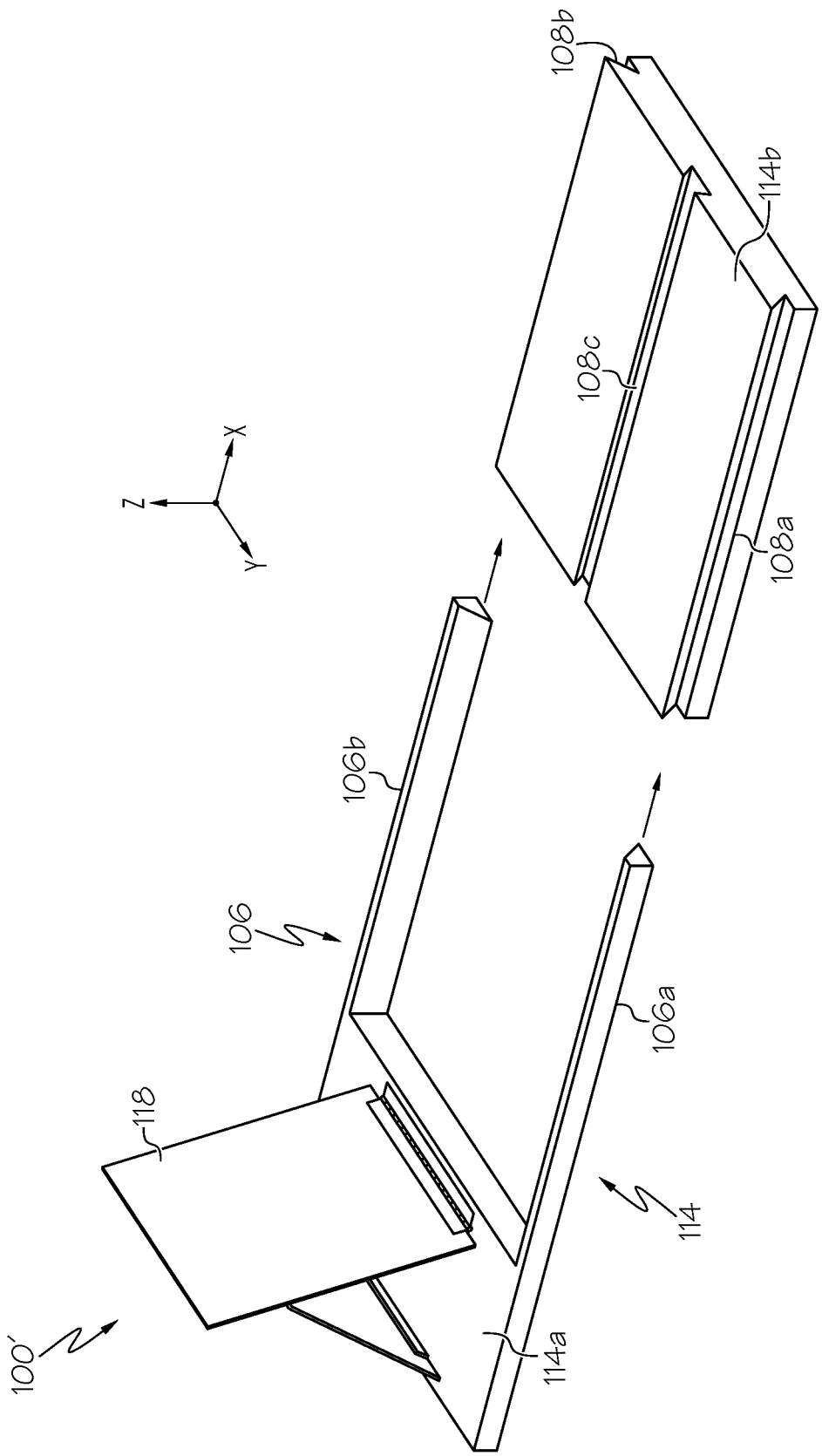
FIG. 3A depicts a perspective view of another embodiment of a subject imaging assembly including a subject support, according to one or more embodiments described herein.
Figure 3B:
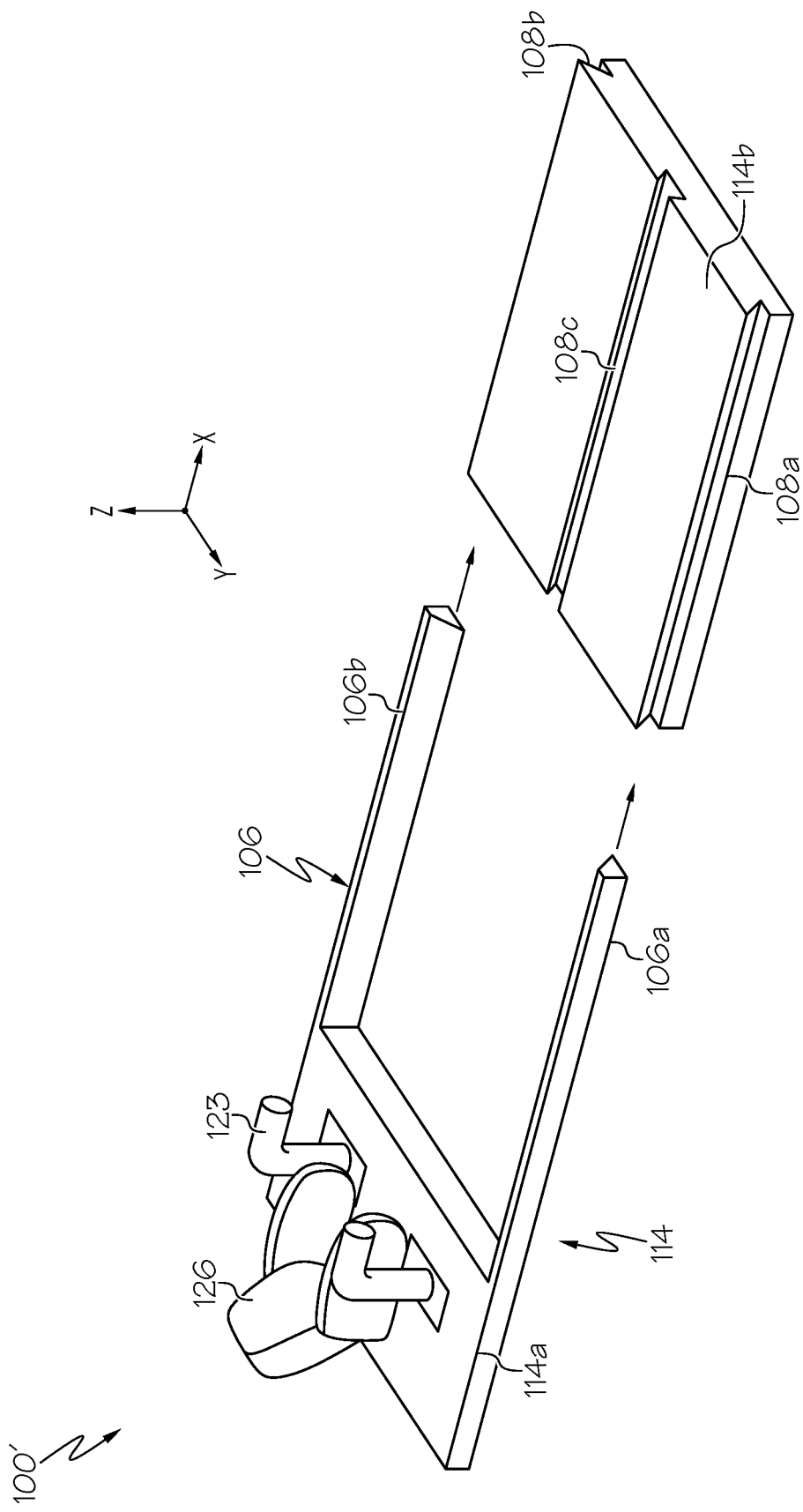
FIG. 3B depicts a perspective view of another embodiment of a subject imaging assembly including a pair of brackets, according to one or more embodiments shown and described herein.

Turning now to FIGS. 3A-3C, another embodiment of a subject imaging assembly 100' is depicted. It should be appreciated that the subject imaging assembly 100' is similar to the subject imaging assembly 100 described herein. As such, like structure is indicated with like reference numerals.

As most clearly depicted in FIGS. 3A and 3B, the substrate 114 of the subject imaging assembly 100 may include the first section 114a and the second section 114b, which may be formed as separate components. In these embodiments, the first section 114a may include a plurality of extrusions 106 that extend from the first section 114a in a longitudinal direction (e.g., in the +x-direction as depicted in the coordinate axes of FIGS. 3A-3C).

The second section 114b of the substrate 114 may include a plurality of rails 108, which may be configured to receive the plurality of extrusions 106 that extend from the first section 114a of the substrate 114 to couple the first section 114a of the substrate 114 to the second section 114b of the substrate 114. In these embodiments, the plurality of rails 108 may have a dove-tail shape, a square and/or rectangular shape, a triangular shape, a circular shape, or any other similar shape that corresponds to the shape of the plurality of extrusions 106.

In these embodiments, the first section 114a of the substrate 114 may further include various hardware utilized for simulating weightbearing on various extremities of the subject. For example, as depicted in FIG. 3A, the first section 114a of the substrate 114 may include the subject support 118, which may allow a subject to be seated in an upright position on the weightbearing simulation assembly 112. In contrast, as depicted in FIG. 3B, the first section 114a of the substrate 114 may include the pair of brackets 126 and support 128, which may be used to simulate weightbearing conditions on the subject when the subject is in a horizontal position, as has been described herein with reference to FIG. 2. Accordingly, in the embodiments described herein, a user may select the first section 114a of the substrate 114 to utilize based on the size of the subject and/or the position in which the subject will be positioned to simulate weightbearing conditions.

For example, referring still to FIGS. 3A and 3B, the first section 114a of the substrate 114 may include a first extrusion 106a and a second extrusion 106b, while the second section 114b of the substrate 114 may include a first rail 108a, a second rail 108b, and a third rail 108c that extends through a center of the second section 114b. In these embodiments, a user may slide the first extrusion 106a along the first rail 108a and the second extrusion 106b along the second rail 108b to couple the first section 114a of the substrate 114 to the second section 114b of the support platform. As has been discussed herein, the first section 114a may be selected based on the dimensions of the subject and the weightbearing simulation being conducted. For example, a first section 114a that includes the subject support 118 may be utilized to place the subject in an upright, seated position conducive for conducting weightbearing simulation on a foot or ankle. However, to conduct weightbearing simulation on a hip or knee, it may be necessary to remove the first section 114a having the subject support 118 and replace the section with a first section 114a having the pair of brackets 126 and support 128.

Although not depicted, it should be further appreciated that, in the embodiments described herein, the first section 114a may include each of the subject support 118, the pair of brackets 126, and the support 128. In these embodiments, the subject support 118 may be collapsible within the support platform (as described herein with reference to FIG. 2) such that a subject may be positioned on the substrate 114 in either an upright seated or horizontal position without the need to replace the first section 114a of the substrate 114.

Further still, although the first section 114a is depicted as being coupled to the second section 114b of the substrate 114 via the plurality of extrusions 106 and the plurality of rails 108, respectively, it should be appreciated that, in some embodiments the substrate 114 may include other and/or alternative mechanisms for coupling the first section 114a to the second section 114b. For example, in the embodiments described herein, the first section 114a or second section 114b may include a plurality of female ports on an underside of the section that may be configured to receive male couplings used to removably attach the first section 114a to the second section 114b. Furthermore, in some embodiments, the second section 114b may include a plurality of cavities that extend into and/or through the second section 114b of the substrate 114. In these embodiments, the plurality of extrusions 106 of the first section 114a may be received within the plurality of cavities formed within the second section 114b of the substrate 114.

Turning now to FIGS. 3C-4D, the plurality of rails 108 formed on the second section 114b of the substrate 114 may be further utilized to adjustably couple the pedal assembly 122 to the substrate 114. In these embodiments, each pedal assembly 122 positioned on the substrate 114 may include at least one foot 130 that is configured to be received by at least one of the plurality of rails 108 formed in the second section 114b of the substrate 114.

For example, as depicted in FIG. 3C, the subject imaging assembly 100' may include a first pedal assembly 122a having a first foot 130a and a second foot 130b, and a second pedal assembly 122b having a third foot 130c and a fourth foot 130d. In these embodiments, the feet of each of the pedal assemblies 122a, 122b may be shaped such that the feet 130a, 130b, 130c, 130d may be received by the plurality of rails 108. For example, as depicted in FIG. 3C, the first foot 130a of the first pedal assembly 122a may be received by the first rail 108a, the second foot 130b of the first pedal assembly 122a and the third foot 130c of the second pedal assembly 122b may each be received by the third rail 108c, and the fourth foot 130d of the second pedal assembly 122b may be received by the second rail 108b. In these embodiments, the first and/or second pedal assembly 122 may be translatable along the plurality of rails 108 (e.g., in the longitudinal direction) such that the distance 124 between the subject and the pedal assemblies 122a, 122b may be adjusted, as has been described in detail herein with reference to FIGS. 1A-2.

Referring now to FIGS. 4A-4D, it should be further appreciated that the pedal assembly 122 may be coupled to the substrate 114 in a variety of orientations that may be determined based on the extremity on which weightbearing simulation will be conducted. For example, as depicted in FIG. 4A, a single pedal assembly (e.g., first pedal assembly 122a) may be coupled to the third rail 108c (e.g., central rail). In these embodiments, the at least one foot 130 of the first pedal assembly 122a may be shaped to conform to the third rail 108c, such that the at least one foot 130 may be received by and translatable along (e.g., in the longitudinal direction) the third rail 108c.

Similarly, the pedal assembly 122 may be further coupled along a side portion of the second section 114b of the substrate 114. For example, as depicted in FIG. 4B, the pedal assembly 122 may engage the first rail 108a and the third rail 108c, such that the pedal assembly 122 is aligned with a lower right-side extremity of the subject. It should be appreciated that the configuration depicted in FIG. 4B may be particularly suited for conducting weightbearing simulation on a lower-right side extremity (e.g., foot, ankle, etc.) of the subject. Alternatively, as depicted in FIG. 4C, the pedal assembly 122 may engage the second rail 108b and the third rail 108c, such that the pedal assembly is aligned with a lower-left side extremity of the subject. As described herein, this configuration may allow for weightbearing simulation of a lower-left side extremity of the subject.

Turning now to FIG. 4D, a pair of pedal assemblies (e.g., first pedal assembly 122a and second pedal assembly 122b) may be translatably coupled to the substrate 114. As has been described in detail herein with reference to FIG. 2, utilizing the first pedal assembly 122a and the second pedal assembly 122b may allow for simultaneous weightbearing simulation on both lower extremities of the subject, which may be beneficial for conducting imaging on a hip and/or knee of the subject.

Figure 5:
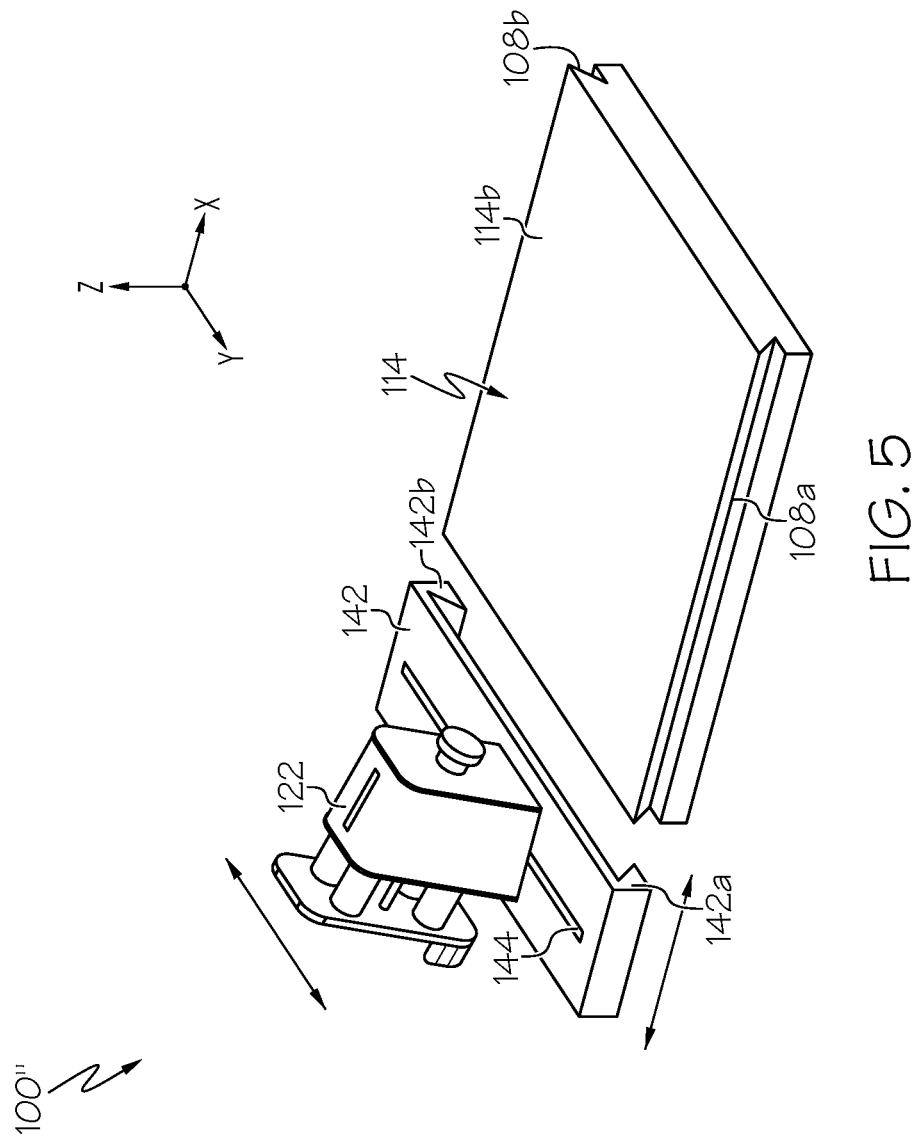
FIG. 5 depicts a partial perspective view of another embodiment of a subject imaging assembly, according to one or more embodiments shown and described herein.

Turning now to FIG. 5, another embodiment of a subject imaging assembly 100" is depicted. It should be appreciated that the subject imaging assembly 100" is similar to the subject imaging assembly 100' and subject imaging assembly 100 described herein. As such, like structure is indicated with like reference numerals.

As depicted in FIG. 5, the second section 114b of the substrate 114 may include a plurality of rails 108, such as a first rail 108a and a second rail 108b. In these embodiments, the second section 114b may further include a translatable member 140 that is configured to engage and translate (e.g. in the longitudinal direction) along the first rail 108a and the second rail 108b. For example, in these embodiments, the translatable member 140 may include a pair of feet, such a first foot 142a and a second foot 142b, that may be similarly shaped to the plurality of rails 108 such that the first foot 142a and the second foot 142b of the translatable member 140 may be received by the first rail 108a and the second rail 108b, respectively.

As further depicted in FIG. 5, the translatable member 142 may further include a slot 144 that extends along at least a portion of a length of the translatable member 142. In these embodiments, the pedal assembly 122 may be translatably coupled to the slot 144, such that the pedal assembly 122 may translate along at least a portion of the length of the translatable member 142 (e.g., in the lateral direction).

In operation, the translatable member 142 may translate within the plurality of rails 108 to adjust the distance between the pedal assembly 122 and the subject, while the pedal assembly 122 may translate (e.g., laterally) within the slot 144 of the translatable member in order to adjust the orientation (e.g., alignment) of the pedal assembly 122 relative to a lower extremity of the subject. For example, in these embodiments, larger subjects and/or subjects having wider hips may require that the pedal assembly 122 be translated towards an outer edge of the translatable member 142 in order to ensure that the pedal assembly 122 is appropriately aligned with an extremity that will be undergoing weight bearing simulation.

Although not depicted, it should be further appreciated that the translatable member 142 illustrated in FIG. 5 may include multiple pedal assemblies 122, as has been discussed herein with reference to FIGS. 2 and 4D. In these embodiments, a first and second pedal assembly may be translatably coupled to the slot 144 of the translatable member 142, such that each of the pedal assemblies is capable of translating in the lateral direction in order to align with a lower extremity of a subject.

Figure 6:
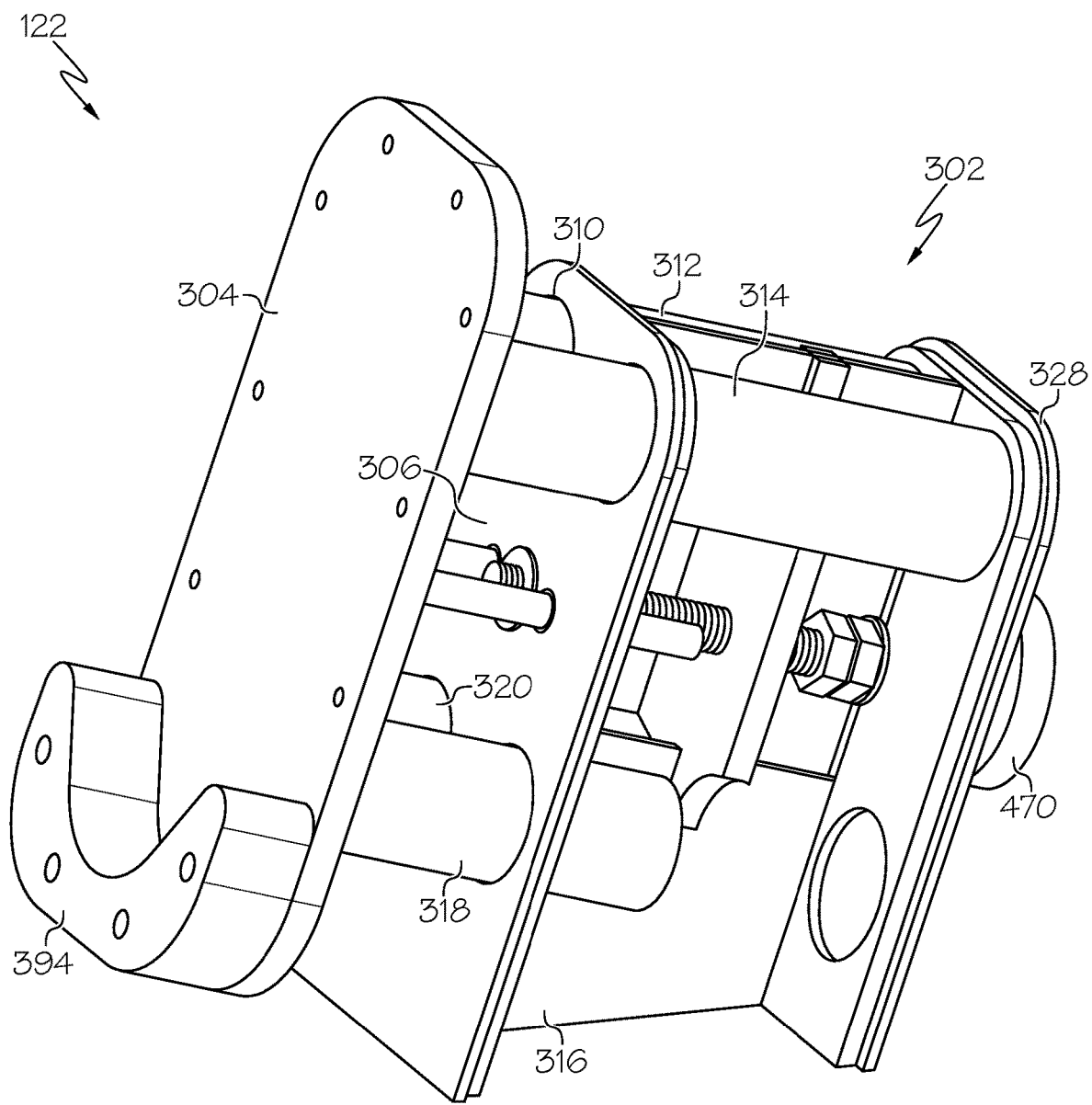
FIG. 6 depicts a perspective views of a pedal assembly, according to one or more embodiments described herein

Referring now to FIG. 6, operation of the pedal assembly 122 will be described in additional detail. For example, during an imaging procedure, the pedal assembly 122 receives a compressive force supplied via a lower extremity of the subject and provides resistance in response to the compressive force to simulate a loadbearing condition for the subject. In embodiments, the pedal assembly 122 comprises an adjustable spring assembly that provides an adjustable amount of resistance that is specifically tailored to the subject to ensure that the subject supplies an adequate amount of compressive force to the pedal assembly 122 to simulate a weightbearing condition for the subject. For example, in embodiments, the pedal assembly 122 may be adjusted such that the subject needs to supply a compressive force corresponding to approximately half of the weight of the subject in order to place the pedal assembly 122 into an imaging state for an image to be captured.

Referring now to FIGS. 6 and 7A-7C, various views of the pedal assembly 122 are depicted. The pedal assembly 122 includes a spring assembly 302 supported via a pedal support assembly 328. The spring assembly 302 includes a contact plate 304, compression plate 306, and a first spring member 310 extending between the contact plate 304 and the compression plate 306. The contact plate 304 faces the subject support 118 when the pedal assembly 122 is disposed on the mounting surface 116 of the substrate 114. A subject being imaged generally places a bottom surface of their foot in contact with the contact plate 304 to supply a load to the contact plate 304. As depicted in FIG. 6, the contact plate 304 may include a heel cup 394 disposed thereon to facilitate the subject positioning the foot properly with respect to the first spring member 310 to ensure uniform application of compressive force to the foot via the spring assembly 302.

In embodiments, the heel cup 394 is rotatably disposed on the contact plate 304. It should be understood that alternative embodiments for securing the foot of the subject to the contact plate 304 are envisioned. For example, in certain implementations, the contact plate 304 includes an attachment element for an item (e.g., a sock, shoe, etc.) worn by the subject. In an example, the attachment element may include Velcro® or the like that is also included on the item worn by the subject.

Figure 7B:
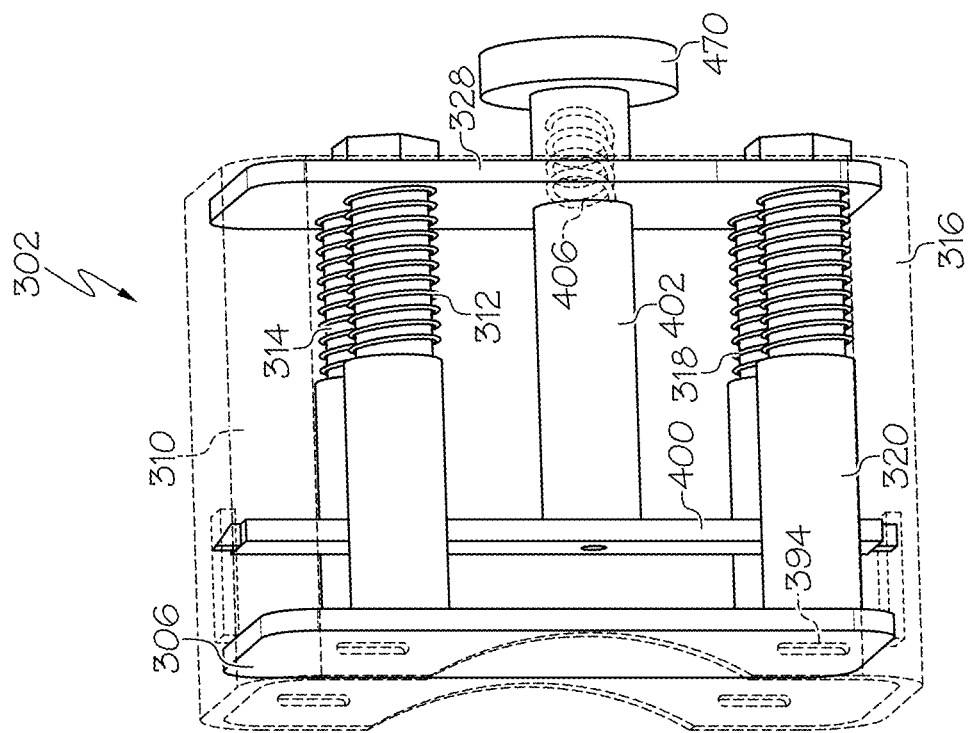
FIG. 7B depicts a partial cross-sectional view of the pedal assembly of FIG. 6, according to one or more embodiments described herein.
Figure 7A:
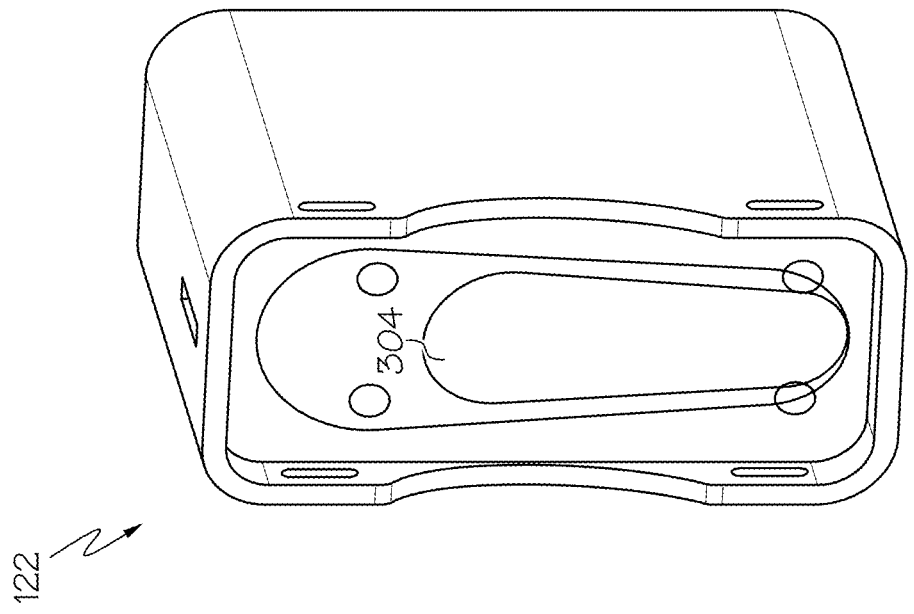
FIG. 7A depicts a perspective view of the pedal assembly of FIG. 6, according to one or more embodiments shown and described herein.

As depicted in FIGS. 6 and 7B, the spring assembly 302 includes the first spring member 310 and a second spring member 316. The first and second spring members 310 and 316 are attached to the contact plate 304 and extend in a compression direction between the contact plate 304 and the compression plate 306. The first spring member 310 includes a first spring 312 and a second spring 314, while the second spring member 316 includes a third spring 318 and a fourth spring 320. In embodiments, the first spring 312 and the second spring 314 are cylindrical polymer spring members having axes extending parallel to one another and perpendicular to the compression direction. In embodiments, the first spring 312 and second spring 314 are selected such that, in combination, the first spring 312 and the second spring 314 provide an amount of force per unit of compression to enable provision of resistance to simulate a weightbearing condition for the subject. The second spring 314 is coupled to the compression plate 306 via a fastener (not depicted) extending through the second spring 314 and the compression plate 306. The first spring 312 is coupled to the contact plate 304 via a fastener (not depicted) extending through the first spring 312 into the contact plate 304. The first spring 312 is attached to the second spring 314 via a fastener (not depicted) contacting both the first and second springs 312 and 314. The third and fourth springs 318 and 320 of the second spring member 316 may be structured similarly to the first and second springs 312 and 314 of the first spring member 310.

The first and second spring members 310 and 316 are arranged to resist movement of the contact plate 304 in the compression direction responsive to the subject supplying a compressive force to the contact plate 304. The compression direction extends perpendicular to the contact plate 304 and the compression plate 306. Such an orientation of the compression direction with respect to the compression plate 306 and contact plate 304 simplifies calibration of the spring assembly 302 by applying a force to the subject's foot that corresponds to a flat surface under gravity, through alternative relative orientations of the compression direction and the contact plate 304 are possible to simulate different situations (e.g., an inclined load).

The first and second spring members 310 and 316 are distributed to provide resistance of motion to an entirety of the subject's foot that the subject is required to supply the compressive force to the pedal assembly using substantially the entirety of the subject's foot. For example, in embodiments, the first spring member 310 is positioned to resist movement of a first portion of the subject's foot (e.g., the metatarsals) and the second spring member 316 is positioned to resist movement of a second portion of the subject's foot (e.g., the calcaneus). This way, the spring assembly 302 ensures that the subject supplies approximately 50% of the compressive force using the metatarsals and approximately 50% of the compressive force using the heel. Such a configuration prevents the subject from applying their weight using only a portion of her foot and ensures that the pedal assembly 122 simulates a true weightbearing condition for the subject. The first and second spring members 310 and 316 may each supply the same resistance of motion of the contact plate 304 so as to simulate a uniform load being supplied across an entirety of the subject's foot. In embodiments, the first and second spring members 310 and 316 resist motion of the contact plate 304 in differing amounts to provide a customized load distribution to the subject's foot.

In these embodiments, the pedal assembly 122 may further include a plurality of indicators 330 that may provide a visual and/or audible queue to a subject, technician, and/or physician that indicate a desired force balance has been achieved during imaging. For example, because the first and second spring members 310 and 316 may each supply the same resistance of motion, it may be possible for the subject and/or technician to identify that the compressible force is unbalanced when the contact plate 304 is angled. Furthermore, in some embodiments, the plurality of indicators 330 may include a light and/or buzzer that provide visual and/or audible feedback that indicates to the subject and/or technician that an appropriate force balance has been achieved.

Additionally, in some embodiments, the subject imaging assembly 100 may be further configured to provide a marker, such as a tantalum marker or other visual indication, on the image captured during weightbearing simulation using the pedal assembly 122. For example, when imaging is conducted with an appropriate force balance, the resulting captured image may include a marker providing confirmation to a technician that the force balance was achieved during image capture. This may allow a technician to ensure the accuracy of the weightbearing simulation imagery when said imagery is reviewed at a later date and/or as part of a subject's medical history.

Referring still to FIGS. 6 and 7B, the number of spring members included in the spring assembly 302 may vary. For example, certain embodiments may include only a single spring member (e.g., extending between central portions of the contact plate 304 and the compression plate 306). For example, in embodiments in which weightbearing simulation is performed on a hip and/or knee of a patient, the compressive force balance between a forefoot and hind foot may be unnecessary. Accordingly, in these embodiments, a spring assembly having only a single spring member may be sufficient for performing weightbearing simulation and capturing imagery on certain extremities.

Moreover, the first and second spring members 310 and 316 may possess various alternative structures than those depicted. For example, in embodiments, the first and second spring members 310 and 316 may each only include a single spring. In such embodiments, the single spring of the first and second spring members 310 and 316 may take the form of the first spring 312 described above (e.g., a cylindrical polymer spring member having an axis oriented perpendicular to the compression direction. Alternatively, the single spring may take a different form (e.g., a metal leaf spring, a coil-shaped spring member, an elastic material, etc.). It should be appreciated that the spring assembly 302 may include any number of springs in any form consistent with the present disclosure.

In embodiments, the spring assembly 302 may include a sensor (not depicted) for measuring the compressive force supplied by the subject. For example, in embodiments, the spring assembly 302 comprises a pressure sensor adapted to measure the compressive force on the contact plate 304 provided by the subject. The pressure sensor may include a piezoelectric pressure sensor, an electromagnetic pressure sensor, an optical pressure sensor, a capacitive pressure sensor, or any other available pressure sensor adaptable to measure the compressive force supplied via the foot of the subject. In embodiments, the spring assembly 302 may include a plurality of pressure sensors to measure the pressure supplied via the subject at various portions of the contact plate 304 (e.g., corresponding to the portions of the contact plate 304 overlapping the first and second spring members 310 and 316). Alternatively or additionally, the spring assembly 302 may include a force sensor configured to measure a total force applied to the contact plate 304. In certain embodiments where the spring assembly 302 incorporates such a sensor, the spring assembly 302 may not include the first and second spring members 310 and 316 and the pedal assembly 122 may provide an indication via the sensor (e.g., via a light or sound generator coupled to the sensor) of when the subject has supplied a desired amount and distribution of compressive force to the contact plate 304 for imaging.

As depicted in FIG. 6, the pedal support assembly 328 is oriented such that the contact plate 304 and the compression plate 306 extend substantially perpendicular to the mounting surface 116 of the substrate 114 depicted in FIGS. 1A-1B and 2. Such an orientation may be useful for imaging the subject's ankle. However, it may be also be useful to image the subject's foot in alternative orientations. For example, it may be useful to adjust the orientation of the spring assembly 302 such that the contact plate 304 and the compression plate 306 extend at an angle of about 30 degrees or about 60 degrees or any angle between and including zero degrees and 60 degrees to facilitate imaging various portions (e.g., the angle, forefoot, and hindfoot) of the subject's foot. In this regard, the pedal support assembly 328 is supported by an adjustable support element having a plurality of support positions. In embodiments, the user may select from among the plurality of support positions to change the orientation of the spring assembly 302 (e.g., to adjust a relative angle between the compression direction and a direction of extension of the substrate 114).

Referring now to FIGS. 7B and 7C, the pedal assembly 122 may further include a depth stop plate 400. The depth stop plate 400 includes a threaded rod 402 having a plunger disposed in an opening formed within the threaded rod 402. A spring element 406 supports the plunger within the opening. In embodiments, the spring element 406 is attached to the compression plate (e.g., the compression plate 306) of a spring assembly (e.g., the spring assembly 302). For example, in embodiments, the plunger of the depth stop plate 400 extends from the compression plate 306 and is supported by the spring element 406 such that an end of the plunger extends outwardly from the threaded rod 402. In operation, once the subject supplies the load to the contact plate 304 and the contact plate 304 contacts the depth stop plate 400, the contact plate 304 initially compresses the spring element 406 via contacting the end of the plunger. The spring element 406 beneficially dampens the impact between the contact plate 304 and the depth stop plate 400.

In these embodiments, the depth stop plate 400 may be further used to limit the movement of the contact plate 304 in the compression direction towards the compression plate 306. The depth stop plate 400 may include an opening 408 formed within the depth stop plate 400 that receives a tab 306a of the compression plate 306. A user may then adjust the tab 306a of the compression plate 306 within the opening 408 of the depth stop plate 400 to limit the motion of the contact plate 304 in the direction of the compression plate 306 based on a subject's weight. In operation, once the subject supplies the load to the contact plate 304 and the contact plate 304 contacts the depth stop plate 400, the contact plate 304 is prevented from moving in the compression direction towards the compression plate 306.

Referring again to FIG. 7B, an adjustment knob 470 coupled to the depth stop plate 400 may be used to control the resistance provided by the pedal assembly 122 when a subject compresses the contact plate 304 in the compression direction towards the compression plate 306. For example, rotation of the adjustment knob 470 by a user causes rotation of the threaded rod 402, which in turn adjusts the positioning of the depth stop plate 400 to adjust the compressive force supplied via the spring assembly 302 when the spring assembly is placed in a loaded state.

Figure 8:
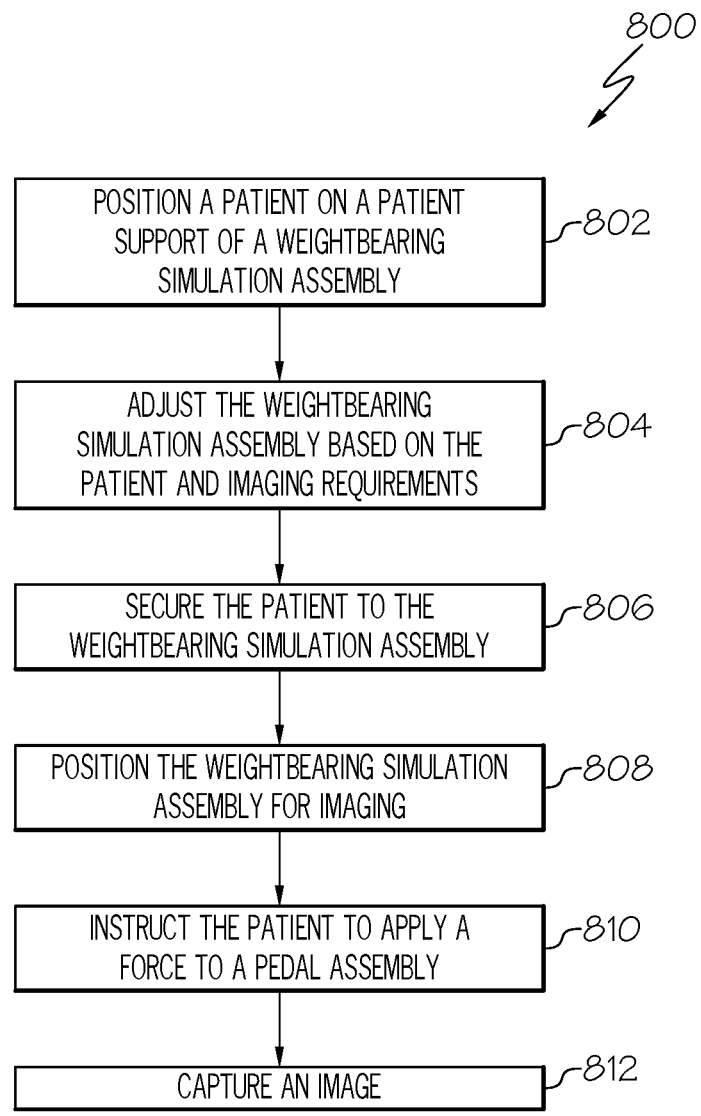
FIG. 8 depicts an illustrative flow diagram of a method for capturing an image of a subject using a weightbearing simulation assembly, according to one or more embodiments described herein.

Referring now to FIG. 8, a flow diagram of an illustrative method 800 for capturing a load-bearing image of a lower extremity of a subject is shown. The method 800 may be performed via the weightbearing simulation assembly 112 described herein used in combination with a subject imaging assembly. For example, in embodiments, the weightbearing simulation assembly 112 may disposed on the support platform 102 of the subject imaging assembly 100 described herein with respect to FIGS. 1A-1B to capture a load-bearing image of the lower extremity of the subject via performance of the method 800. In embodiments, the weightbearing simulation assembly 112 may be calibrated prior to performance of the method 800. For example, practice weights may be applied to the pedal assembly 122 to calibrate the settings for the spring assembly 302.

At block 802, a subject is positioned on the subject support of a weightbearing simulation assembly 112. In embodiments, the weightbearing simulation assembly 112 may be disposed on the support platform 102, which may be positioned out of alignment with an imaging system to facilitate positioning the subject on the subject support 118.

At block 804, the weightbearing simulation assembly 112 is adjusted based on the subject and imaging requirements. For example, in embodiments, the distance 124 between the subject support 118 and the pedal assembly 122 is adjusted based on a length of the subject's leg to be imaged. In embodiments, the distance 124 is adjusted such that the subject's leg extends in the first direction and substantially the entirety of the subject's leg is in contact with the mounting surface 116 of the substrate 114. In embodiments, a relative angle between the first direction and the compression direction of the pedal assembly 122 may be adjusted based on a portion of the subject's lower extremity being imaged. For example, in embodiments, to image an ankle of the subject, a first support position is selected to place the compression direction at a zero degree angle (e.g., parallel or substantially parallel) to the first direction. In embodiments, to image a forefoot of the subject, a second support position is selected to place the compression direction at a 30 degree angle relative to the first direction. In embodiments, to image a hindfoot of the subject, a third support position is selected to place the compression direction at a 45 degree angle relative to the first direction.

In a block 806, the subject is secured to the weightbearing simulation assembly 112. For example, in embodiments, the subject's foot is secured to the pedal assembly 122 via placement of the subjects heel on the heel cup 394 and/or tightening an adjustable strap around the subject's foot. Alternatively, in embodiments in which a knee and/or hip of the subject is being imaged, the subject may be secured by pressing their shoulders into the pair of brackets 126 and resting their head and/or neck in the support 128. At block 808, the weightbearing simulation assembly 112 is positioned for imaging. It should be appreciated that, in these embodiments the positioning of the weightbearing simulation assembly 112 and the subject may be dependent on the size (e.g., weight, height, etc.) of the subject, as well as the area of the subject being imaged.

In embodiments adjustment of the weightbearing simulation assembly 112 also includes adjusting positions of the depth stop plate 400 between the contact plate 304 and the compression plate 306 based on a weight of the subject. As described herein, adjustment of the depth stop plate 400 determines a compressive force supplied via the first and second spring members 310 and 316 to the contact plate 304 when the subject supplies a load to the contact plate 304. The load supplied by the subject causes the contact plate 304 to contact the depth stop plate 400. As such, the positioning of the depth stop plate 400 determines the compressive force supplied via the first and second spring members 310 and 316. In embodiments, the spring assembly 302 is calibrated via placing a scale in contact with the contact plate 304 and using the scale to measure the compressive force supplied via the first and second spring members 310 and 316 as a function of the rotational position of the adjustment knob 470. In embodiments, adjustment of the weightbearing simulation assembly 112 includes rotating the adjustment knob 470 to a position such that the compressive force supplied via the first and second spring members 310 and 316 corresponds to approximately one half of the weight of the subject.

In a block 810, the subject is instructed to apply a force to the pedal assembly 122. For example, once the pedal assembly 122 is placed within an imaging system, the subject may be instructed to press her foot into the contact plate 304 so as to compress the first and second spring members 310 and 316 in the compression direction. The instructions may be automated (e.g., transmitted via a speaker system). In a block 812, once the subject causes the contact plate 304 to contact the depth stop plate 400, thereby causing the first and second spring members 310 and 316 to exert a compressive force specifically tailored to the subject, an image is captured of the subject's lower extremity. The imaging system may capture a CT scan or an MRI image of the subject's lower extremity while the lower extremity is in a weightbearing condition so as to capture three-dimensional structural measurements of the subject's lower extremity.

In view of the foregoing description, it should be appreciated that weightbearing simulation assemblies that are compatible with existing imaging systems may be used to capture three dimensional images of lower extremities of subjects while the lower extremities are in a loadbearing condition. The weightbearing simulation assemblies described herein include a pedal assembly with an adjustable spring assembly. The spring assembly disclosed herein is easily adjustable by altering the relative positioning of motion limiters disposed between a contact plate and a compression plates so as to limit the range of motion of the contact plate such that, when the spring assembly is placed in a loaded state by the subject, the spring assembly applies a compressive force to the contact plate that is specifically tailored to the subject. Moreover, a relative angle between the compressive force and an imaging axis of the imaging system may be adjusted to facilitate imaging multiple regions of the subject's foot. As such, the assemblies and methods described herein facilitate low cost load-bearing images at relatively low cost by providing compatibility with existing imaging systems.

Embodiments may be further described with reference to the following numbered clauses:

Clause 1. A weightbearing simulation assembly, comprising: a substrate comprising a mounting surface, the substrate further including a first section and second section hingedly coupled together such that the first section and second section are foldable relative one another; a subject support disposed on a first section of the mounting surface; and a pedal assembly disposed on a second section of the mounting surface, wherein the pedal assembly is spaced apart from the subject support by a distance, the pedal assembly comprising: a contact plate configured to: receive a compressive force from a subject; measure the compressive force; and provide an indication that the compressive force corresponds to a weightbearing condition of the subject.

Clause 2. The weightbearing simulation assembly of clause 2, wherein the substrate further includes a translation support mechanism configured to couple the pedal assembly to the second section of the mounting surface, such that the pedal assembly is translatable along the substrate in a longitudinal direction.

Clause 3. The weightbearing simulation assembly of clause 1 or 2, wherein the first section of the mounting surface further includes a cavity.

Clause 4. The weightbearing simulation assembly of any of clauses 1-3, wherein the subject support is collapsible within the cavity formed in the first section of the mounting surface.

Clause 5. The weightbearing simulation assembly of any of clauses 1-4, further comprising a pair of brackets coupled to the first section of the substrate.

Clause 6. The weightbearing simulation assembly of any of clauses 1-5, further including a support coupled to the first section of the substrate.

Clause 7. The weightbearing simulation assembly of any of clauses 1-6, wherein the pedal assembly is removably coupled to the second section of the mounting surface.

Clause 8. The weightbearing simulation assembly of any of clauses 1-7, wherein the subject support is removably disposed on the first section of the mounting surface.

Clause 9. The weightbearing simulation assembly of any of clauses 1-8, wherein the substrate further includes a third section configured to extend a length of the substrate.

Clause 10. The weightbearing simulation assembly of any of clauses 1-9, wherein a pair of brackets and a support are coupled to the third section of the substrate.

Clause 11. A weightbearing simulation assembly, comprising: a substrate comprising a mounting surface, the substrate further including a first section having a plurality of extrusions and a second section having a plurality of rails, the plurality of rails being configured to receive the plurality of extrusions; at least one pedal assembly translatably coupled to the second section of the substrate, the at least one pedal assembly comprising: a contact plate configured to: receive a compressive force from a subject; measure the compressive force; and provide an indication that the compressive force corresponds to a weightbearing condition of the subject.

Clause 12. The weightbearing simulation assembly of clause 11, wherein the plurality of extrusions and the plurality of rails have a dovetail-shaped profile.

Clause 13. The weightbearing simulation assembly of any of clauses 11-12, wherein the at least one pedal assembly further includes at least one foot configured to be received by at least one of the plurality of rails.

Clause 14. The weightbearing simulation assembly of clauses 11-13, wherein the at least one pedal assembly translates along at least one of the plurality of rails in a longitudinal direction.

Clause 15. The weightbearing simulation assembly of clauses 11-14, further comprising a translatable member having a pair of feet coupled to the plurality of rails, such that the translatable member translates in a longitudinal direction along the plurality of rails.

Clause 16. The weightbearing simulation assembly of any of clauses 11-15, wherein the translatable member further includes a slot extending along at least a portion of a length of the translatable member.

Clause 17. The weightbearing simulation assembly of any of clauses 11-16, wherein the at least one pedal assembly is translatably coupled to the slot of the translatable member, such that the at least one pedal assembly translates in a lateral direction along the slot.

Clause 18. The weightbearing simulation assembly of any of clauses 11-17, wherein the weightbearing simulation assembly is compatible with medical resonance imaging devices.

Clause 19. The weightbearing simulation assembly of any of clauses 11-18, wherein the weightbearing simulation assembly is compatible with computed tomography scanning devices.

Clause 20. A method for capturing an image of a subject using a weightbearing simulation assembly, the method comprising: positioning the subject on a subject support of the weightbearing simulation assembly; adjusting the weightbearing simulation assembly based on the subject and imaging requirements; securing the subject to the weightbearing simulation assembly; positioning the weightbearing simulation assembly for imaging; instructing the subject to apply a force to a pedal assembly positioned on the weightbearing simulation assembly; and capturing the image of an extremity of the subject.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A weightbearing simulation assembly, comprising:
a substrate comprising a mounting surface, the substrate further including a first section and a second section hingedly coupled together such that the first section and the second section are foldable relative to one another;
a subject support disposed on the first section of the mounting surface; and
a pedal assembly disposed on the second section of the mounting surface, wherein the pedal assembly is spaced apart from the subject support by a distance, the pedal assembly comprising:
a contact plate configured to receive a compressive force in a compression direction from a subject;
at least one spring member coupled to the contact plate and arranged to provide a resistance against the compressive force opposing the compression direction;
an adjustable depth stop plate positionable to limit a movement of the contact plate in the compression direction beyond a predetermined distance; and
a plurality of indicators positioned to provide an indication that the compressive force corresponds to a weightbearing condition of the subject.

2. The weightbearing simulation assembly of claim 1, wherein the substrate further includes a translation support mechanism configured to couple the pedal assembly to the second section of the mounting surface, such that the pedal assembly is translatable along the substrate in a longitudinal direction.

3. The weightbearing simulation assembly of claim 1, wherein:
the first section of the mounting surface defines a cavity, and the subject support is collapsible within the cavity.

4. The weightbearing simulation assembly of claim 1, wherein:
the pedal assembly further comprises a compression plate having an adjustable tab;
the adjustable depth stop plate defines an opening for receiving the adjustable tab; and
the adjustable tab is adjustable to limit the movement of the contact plate in the compression direction based on a weight of the subject.

5. The weightbearing simulation assembly of claim 1, further comprising a pair of brackets coupled to the first section of the substrate.

6. The weightbearing simulation assembly of claim 1, further including a support coupled to the first section of the substrate.

7. The weightbearing simulation assembly of claim 1, wherein the pedal assembly is removably coupled to the second section of the mounting surface.

8. The weightbearing simulation assembly of claim 1, wherein the subject support is removably disposed on the first section of the mounting surface.

9. The weightbearing simulation assembly of claim 1, wherein the substrate further includes a third section configured to extend a length of the substrate.

10. The weightbearing simulation assembly of claim 9, wherein a pair of brackets and a support are coupled to the third section of the substrate.

11. The weightbearing simulation assembly of claim 1, wherein the pedal assembly further comprises an adjustment knob coupled to the adjustable depth stop plate.

12. A weightbearing simulation assembly, comprising:
a substrate comprising a mounting surface, the substrate further including a first section having a plurality of extrusions and a second section having a plurality of rails, the plurality of rails being configured to receive the plurality of extrusions;

at least one pedal assembly translatably coupled to the second section of the substrate, the at least one pedal assembly comprising:
- a contact plate configured to receive a compressive force in a compression direction from a subject;
  - at least one spring member coupled to the contact plate and arranged to provide a resistance against the compressive force opposing the compression direction;
  - an adjustable depth stop plate positionable to limit a movement of the contact plate in the compression direction beyond a predetermined distance; and
  - a plurality of indicators positioned to provide an indication that the compressive force corresponds to a weightbearing condition of the subject.

13. The weightbearing simulation assembly of claim 12, wherein the at least one pedal assembly further includes at least one foot configured to be received by at least one of the plurality of rails.

14. The weightbearing simulation assembly of claim 12, wherein the at least one pedal assembly translates along at least one of the plurality of rails in a longitudinal direction.

15. The weightbearing simulation assembly of claim 12, further comprising a translatable member having a pair of feet coupled to the plurality of rails, such that the translatable member translates in a longitudinal direction along the plurality of rails.

16. The weightbearing simulation assembly of claim 15, wherein the translatable member further includes a slot extending along at least a portion of a length of the translatable member.

17. The weightbearing simulation assembly of claim 16, wherein the at least one pedal assembly is translatably coupled to the slot of the translatable member, such that the at least one pedal assembly translates in a lateral direction along the slot.

18. The weightbearing simulation assembly of claim 12, wherein the weightbearing simulation assembly is compatible with medical resonance imaging devices.

19. The weightbearing simulation assembly of claim 12, wherein the weightbearing simulation assembly is compatible with computed tomography scanning devices.

20. The weightbearing simulation assembly of claim 12, wherein the plurality of extrusions and the plurality of rails have a dovetail-shaped profile.

* * * * *